United States Patent
Hellgren et al.

(10) Patent No.: US 8,284,724 B2
(45) Date of Patent: Oct. 9, 2012

(54) METHOD OF DECIDING TO RELEASE COMMUNICATION RESOURCES

(75) Inventors: Vesa Pauli Hellgren, Helsinki (FI); Serafim Petsis, Attikis (GR)

(73) Assignee: Nokia Siemens Networks Oy, Espoo (FI)

( * ) Notice: Subject to any disclaimer, the term of this patent is extended or adjusted under 35 U.S.C. 154(b) by 690 days.

(21) Appl. No.: 12/457,110

(22) Filed: Jun. 1, 2009

(65) Prior Publication Data

US 2009/0310551 A1    Dec. 17, 2009

(30) Foreign Application Priority Data

May 30, 2008 (EP) ..................................... 08104189

(51) Int. Cl.
  *H04W 4/00* (2009.01)
  *H04B 7/212* (2006.01)
  *G06F 19/00* (2006.01)

(52) U.S. Cl. ........ 370/329; 370/341; 370/431; 370/437; 710/44

(58) Field of Classification Search .......... 370/300–479; 342/35.31, 358; 455/411–415; 375/E7.141; 700/94–99; 710/42–47; 379/92.01, 92.02

See application file for complete search history.

(56) References Cited

U.S. PATENT DOCUMENTS

| | | | |
|---|---|---|---|
| 2002/0112054 A1* | 8/2002 | Hatanaka | 709/225 |
| 2004/0215794 A1 | 10/2004 | Lauer | |
| 2006/0189298 A1* | 8/2006 | Marcelli | 455/411 |
| 2007/0156911 A1 | 7/2007 | Menten | |
| 2007/0192846 A1 | 8/2007 | Thai et al. | |

OTHER PUBLICATIONS

"Digital cellular telecommunications system (Phase 2+); Universal Mobile Telecommunications System (UMTS); Interworking between the Public Land Mobile Network (PLMN) supporting packet based services and Packet Data Networks (PDN) (3GPP TS 29.061 version 7.7.0; Release 7); ETSI TS 129 061", Apr. 2008, paragraph [0006] * p. 15, paragraph 11, figure 7 *, * paragraph [16.2] * * paragraph [16.4.4] * sub attr. #11 "36PP Session-Stop-Indicator", * p. 59, paragraph 16. 2—p. 16; 4.7.1; table 7.

* cited by examiner

*Primary Examiner* — Afsar M. Qureshi
(74) *Attorney, Agent, or Firm* — Staas & Halsey LLP

(57) ABSTRACT

A method of deciding to release communication resources used for a network access server session in a communication network is provided, wherein the method involves receiving an Accounting Stop Request for a PDP context associated to the network access server session, deciding whether a Session Stop Indicator is included in the Accounting Stop Request, in case no Session Stop Indicator is included deciding whether further PDP contexts are associated with the network access server session, in case no further PDP context is associated with the network access server session, starting an IDLE Timer to determine a point in time for releasing the communication resources.

13 Claims, 2 Drawing Sheets

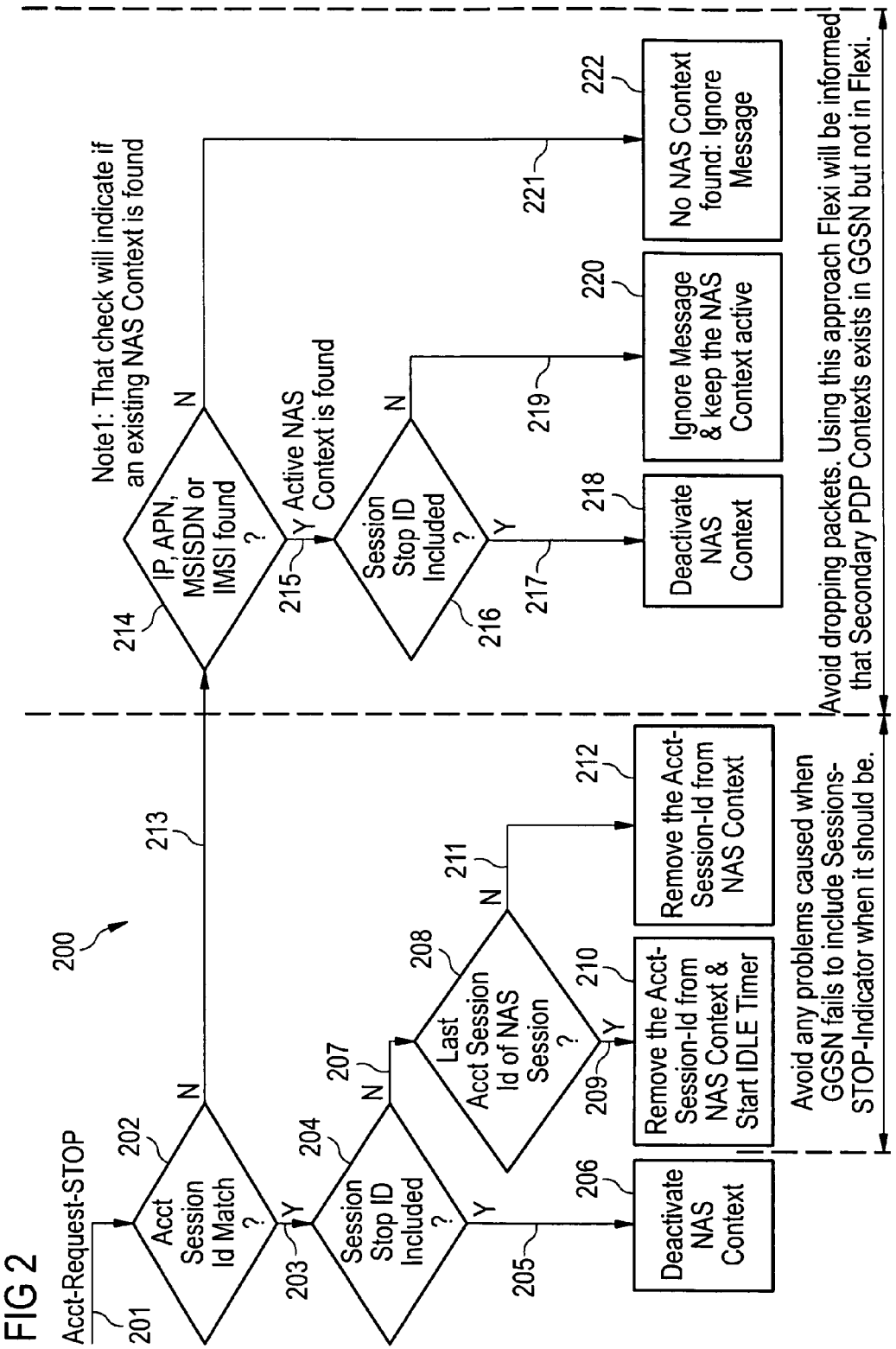

METHOD OF DECIDING TO RELEASE COMMUNICATION RESOURCES

CROSS REFERENCE TO RELATED APPLICATIONS

This application is based on and hereby claims priority to European Application No. EP08104189 filed on May 30, 2008, the contents of which are hereby incorporated by reference.

BACKGROUND OF THE INVENTION

The present invention relates to a method of deciding to release communication resources.

In a Public Land Mobile Network (PLMN), a Service Aware (SA) node such as the so-called Flexi ISN can be deployed behind a Gateway GPRS Support Node (GGSN), corresponding to a so-called Gi-deployment, to enable operators to offer services in a more flexible and efficient way. The communication between GGSN and SA node is performed through the Network Access Server (NAS) interface. NAS interface uses Radius Authentication Dial In User Service (RADIUS) authentication for allocating the IP address (if needed) and RADIUS accounting for providing the IP address, International Mobile Subscriber Identity (IMSI) and Mobile Subscriber ISDN (MSISDN) to the SA node. The NAS can be for example a 3rd party GGSN that acts as a RADIUS client and a SA node that acts as a RADIUS server. The user plane traffic is carried in plain IP, Generic Routing Encapsulation (GRE) or IP-in-IP tunnels and the RADIUS signalling is used to set up the user plane traffic in a similar way as in the GPRS/3G networks. The NAS interface can be referred to as being the southbound Gi interface, as an alternative to the Gn interface.

During the Public Data Network (PDP) Context activation procedure, an "Accounting-Request-START" message, including an Access Point Name (APN), is sent from GGSN towards the SA node to inform it about the subscriber identification (IMSI, MSISDN) so that user profile can be determined. Upon receiving of the message a NAS context is established. Thus, the START message is used to inform SA node about new sessions, so that SA node can monitor them properly. An "Accounting-Request-STOP" message can be used by GGSN to inform the SA node about a possible PDP Context termination, thus SA has to delete the already established NAS Context.

RADIUS Accounting-Request-Start and Stop messages may be used during both primary and secondary PDP context activation and deactivation procedures, respectively. If the SA node is used for IP address assignment, then, upon reception of a RADIUS "Accounting-Request-STOP" message for all PDP Contexts associated to a session defined by APN and IMSI or MSISDN, the SA node (server) may make the associated IP address available for assignment.

In order to avoid race conditions, the GGSN shall include a 3GPP Vendor-Specific sub-attribute Session Stop indicator when it sends the "Accounting-Request-Stop" for the last PDP context of a PDP session and the PDP session is terminated (i.e. the IP address and all GTP tunnels can be released). The SA server shall not assume the PDP session terminated until an "Accounting-Request-Stop" with the Session Stop indicator is received. In 3GPP reference architecture, the SA function corresponds to Flow Based Charging (FBC), which is implemented in Release 6 TPF (Traffic Plane Function) and in Release 7 PCEF (Policy and Charging Enforcement Function). 3GPP does not define interface between GGSN and TPF/PCEF. SA function can be integrated as part of GGSN or it can be implemented separate node connected to GGSN via Gi interface defined in 3GPP specification 29.061, which corresponds to the NAS interface described above.

Even though 3GPP reference architecture does not specify details about the case where GGSN and TPF/PCEF are implemented as separate nodes, this alternative is often used in practice. For operators, this approach has the benefit that SA can be introduced without making changes to existing GGSN nodes.

However, there may be a need for a method of deciding to release communication resources, which provides an improved performance; in particular, with respect to a better determination of the point in time the resources can be released.

SUMMARY

The inventors propose a method of deciding to release communication resources used for a network access server session in a communication network, wherein the method comprises receiving an Accounting Stop Request for a PDP context associated to the network access server session, deciding whether a Session Stop Indicator is included in the Accounting Stop Request, in case no Session Stop Indicator is included deciding whether further PDP contexts are associated with the network access server session, in case no further PDP context is associated with the network access server session, starting an IDLE Timer to determine a point in time for releasing the communication resources.

In particular, the Accounting Stop Request may be a RADIUS Accounting Stop Request. Furthermore, the Accounting Stop Request may be sent from a GGSN. The GGSN may operate according to the 3GPP protocol. In particular, the timer may be configurable by an operator, e.g. of the NAS. Furthermore, a method may be performed by a device, e.g. a network access server, which is adapted to perform the above mentioned.

According to an exemplary aspect a method of indicating a free resource in a communication network is provided, wherein the method comprises implementing an Accounting Stop Request into a RADIUS Accounting Stop Request, and transmitting the Accounting Stop Request to a network access server of the communication network.

According to an exemplary aspect a program element is provided, which, when being executed by a processor, is adapted to control or carry out a method according to an exemplary aspect.

According to an exemplary aspect a computer-readable medium is provided, in which a computer program is stored which, when being executed by a processor, is adapted to control or carry out a method according to an exemplary aspect.

The term "communication resource" may particularly denote or relate to an IP address, an International Mobile Subscriber Identity, or a Mobile Subscriber ISDN, for example, which may be allocated to a specific communication in case a request for a communication or data transfer is sent, e.g. by using so-called RADIUS authentication and/or RADIUS accounting.

The term "network access server session" may particularly denote a session for which a "network access server (NAS) context" may be established when an Accounting-Request-Start or accounting start request is sent from a gateway, e.g. a GGSN toward a service aware (SA) node to inform the SA node about subscriber identification (IMSI, MSISDN) so that a user profile may be determined. However, a new NAS context may not always be created when Accounting-Request-Start is received. A new NAS context may only be created if Accounting-Request-Start is about a new PDP session, i.e. a received tuple (IMSI, MSISDN, IP address, APN) is unique. If Accounting-Request-Start is about existing PDP session and thus related to some existing NAS context in SA node, then the Accounting Session ID may be recorded to this NAS context (if Accounting Session ID is received in the message). In general there may be a one-to-one relation between PDP session and NAS context, i.e. NAS context can be single primary PDP context or NAS context is a set of secondary PDP contexts belonging to the same PDP session. When PDP session contains more than one PDP context, all those PDP contexts may be called secondary PDP contexts and if PDP session contains one PDP context, this PDP context may be called primary PDP context.

That is, a NAS context may be established at the beginning of a new session, service or communication relating to a new PDP session and may be used in order to identify the specific PDP session.

By providing a method according to an exemplary aspect it may be possible to ensure that resources are released earlier than in the case of known methods. In particular, the method may provide a procedure to handle cases in which no Session Stop Indicators or Session Stop Indicator attributes are sent together with the Accounting Stop Request. This may in particular happen, in cases where the GGSN, which sends the Accounting Stop Request, is not compliant with latest 3GPP Specs where usage of Session Stop Indicator attribute is defined. In other words, in these cases a Session Stop Indicator attribute may not sent even if an "Accounting-Request-Stop" message, e.g. a RADIUS Accounting Stop Request, is about the last PDP context of the PDP session. In such faulty cases, according to the known procedures, NAS context may not be released—if one follows pedantically 3GPP specifications—and thus resources are wasted. This wasting of resources may be reduced when using a method according to an exemplary aspect.

Although, problems arising from the use of GGSN which are not compliant with the 3GPP specification, could be fixed at the GGSN and not at the receiving side, e.g. a receiver of a RADIUS requests, it may be advantageous to take care of at least some of the problems at the receiving side, since this may improve the flexibility of the used GGSN node. For example, it may not be necessary to make any changes to legacy GGSN and/or it may be possible to send Session Stop Indicator only if a certain (RADIUS) accounting mode is selected, and this (RADIUS) accounting mode cannot be enabled unless operator has bought the related software sales item.

Next, further exemplary embodiments of the method are described. However, these embodiments also apply to the, the program element, and the computer-readable medium.

According to another exemplary embodiment of the method the determination of the point in time is based on a predetermined time interval, wherein the predetermined time interval is measured from the starting of the IDLE Timer. In particular, the predetermined time interval may be in the range of a few minutes, e.g. the time interval may be less than 15 minutes or less than 10 minutes or less than 5 minutes.

Furthermore, it should be noted that the IDLE Timer according to exemplary embodiments is not the same idle timer, which may be used in general to terminate idle bearer sessions in GGSN or SA node according to commonly known methods. Typical value for general idle timer can be several hours, while the IDLE Timer used in exemplary embodiments would typically have configured value as only a few minutes.

If user plane traffic is detected before IDLE Timer expires then SA node knows that there is active (but yet unknown) PDP context related to NAS context and it may start using general idle timer to detect inactivity in the NAS context. Thus, the IDLE Timer according to exemplary embodiments may be formed as an additionally IDLE Timer which may precede the commonly known idle timer.

Even if usage of IDLE timer may mean that detection of the terminated PDP session may happen later than it actually occurred, the SA node may use the correct termination time when it is informing other nodes about the terminated NAS context. Event-Timestamp attribute may be used in RADIUS and Diameter requests originated from the SA node to indicate the right time when the NAS context was terminated and Change Time information element in CDR may be used for same purpose in offline charging interface.

According to another exemplary embodiment the method further comprises, in case the IDLE Timer is started, checking whether further communication associated to the network access server session is performed in the communication network.

According to another exemplary embodiment the method further comprises, in case no further communication is performed till the determined point in time is reached, deactivating the network access server session. In particular, the deactivating may be performed by deactivating a NAS context which is associated with or established for the network access server session.

According to another exemplary embodiment the method further comprises deactivating the network access server session in case it is determined that a Session Stop Indicator is included in the Accounting Stop Request.

According to another exemplary embodiment the method further comprises removing the Accounting Session ID from a network access server context associated with the network access server session, in case no Accounting Session ID is included. In particular, the Accounting Session ID may be included in the Accounting Stop Request and/or may be known to the receiving NAS.

According to another exemplary embodiment the method further comprises comparing an Accounting Session ID implemented in the Accounting Stop Request with Accounting Session IDs associated with the network access server session before the decision whether a Session Stop Indicator is included in the Accounting Stop Request is performed.

In particular, the decision whether a Session Stop Indicator is included in the Accounting Stop Request may be performed directly after the comparing, in case a matching Accounting Session ID associated with the network access server session is found.

Furthermore, the Accounting Stop Request may be associated with the Accounting Session ID, i.e. the stop request may relate to the specific accounting session. Furthermore, the Accounting Session ID may be implemented in a network access server context corresponding to or associated with the respective network access server session. Moreover, the decision whether a Session Stop Indicator is included in the Accounting Stop Request may be performed directly only in case that a matching Accounting Session ID is found.

According to another exemplary embodiment the method further comprises, in case further PDP context is associated with the network access server session, removing the Accounting Session ID from the network access server context corresponding to or associated with the respective network access server session. In particular, in this case no IDLE Timer may be started and/or no deactivating of NAS context may be performed.

According to another exemplary embodiment the method further comprises, in case that no matching Accounting Session ID is found, determining whether a value of an identification parameter implemented in the received Accounting Stop Request matches a value of a corresponding identification parameter associated with the network access server session.

In particular, the identification parameters may be an IP address, an APN, an International Mobile Subscriber Identity (IMSI) or a Mobile Subscriber ISDN (MSISDN). By comparing values of such parameters it may be possible to determine the network access server session the received Accounting Stop Request corresponds to even in cases when the Accounting Session ID is not known to the side receiving the Accounting Stop Request, e.g. a network access server. That may be the case when the receiving side did not receive or did not process an initially transmitted accounting start request, into which usually the Accounting Session ID is implemented. The result of this determining or checking may indicate whether an existing network access server context is found or not. In particular, it may be possible to avoid that a Service Aware (SA) node may start dropping all the user plane packets related to remaining PDP context(s) in the sending GGSN and may ignore accounting stop/interim messages related to those PDP(s).

According to another exemplary embodiment the method further comprises, in case no matching value of identification parameters is found, ignoring the received Accounting Stop Request at the receiving side.

According to another exemplary embodiment the method further comprises, in case a matching value of identification parameters is found, deactivating the network access server session in case it is determined that a Session Stop Indicator is included in the Accounting Stop Request.

According to another exemplary embodiment the method further comprises, in case a matching value of identification parameters is found, ignoring the received Accounting Stop Request at the receiving side in case it is determined that no Session Stop Indicator is included in the Accounting Stop Request.

Summarizing an exemplary aspect of the proposal may be seen in providing a way to detect in TPF/PCEF (SA node) when PDP session has been terminated in GGSN. If Session Stop Indicator is included in RADIUS accounting STOP request, then SA node may know that PDP session is terminated in GGSN and the related NAS context may be terminated in SA node.

Furthermore, the SA node may keeps track of all the Accounting Session ID values related to NAS context, i.e. all the Accounting Session ID values of all PDP contexts of the related PDP session. When RADIUS accounting STOP request is received, SA node will remove the related Acct-Session-Id. If there are no Acct-Session-Ids linked to NAS context after this procedure, the SA nodes may start an IDLE Timer. If no user plane traffic is detected before IDLE Timer expiration, NAS context may be terminated. However, if user plane traffic is detected before IDLE Timer expires, then SA node may know that there are still active PDP contexts in the PDP session even though SA node does not know the related Acct-Session-Id.

Additionally, if SA node receives RADIUS INTERIM/STOP accounting request and Accounting Session ID cannot be associated with NAS context, then the SA node may analyze the IP address, IMSI, MSISDN and APN values in the RADIUS request. If matching NAS context can be found based on these values, then the received Accounting Session ID can be linked to the found NAS context and accounting request may be processed.

It has to be noted that embodiments and aspects have been described with reference to different subject-matters. In particular, some embodiments and aspects have been described with reference to apparatus type claims whereas other embodiments have been described with reference to method type claims. However, a person skilled in the art will gather from the above and the following description that, unless other notified, in addition to any combination of features belonging to one type of subject-matter also any combination between features relating to different subject-matters, in particular between features of the apparatus type claims and features of the method type claims is considered to be disclosed with this application.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 schematically illustrates a flowchart of a method according to an exemplary embodiment.

DETAILED DESCRIPTION

Figure 1:
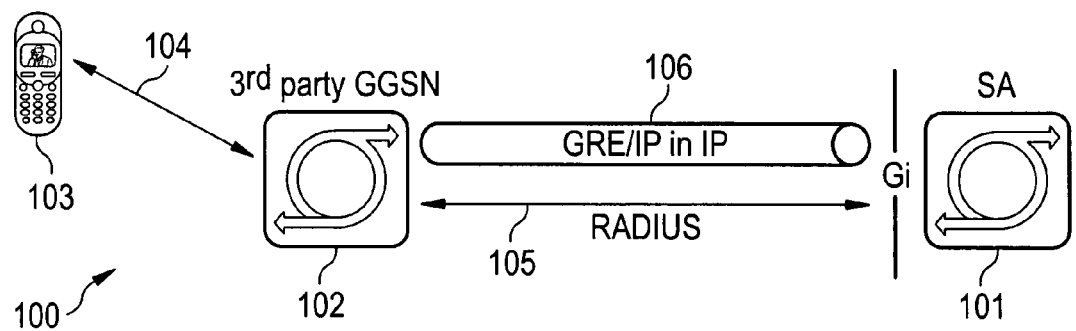
FIG. 1 schematically shows a SA node in Gi deployment.

Reference will now be made in detail to the preferred embodiments of the present invention, examples of which are illustrated in the accompanying drawings, wherein like reference numerals refer to like elements throughout.

As already mentioned above a Public Land Mobile Network (PLMN) 100 may comprise a Service Aware (SA) node 101, such as the so-called Flexi ISN, which can be deployed behind a Gateway GPRS Support Node (GGSN) 102, corresponding to a so-called Gi-deployment, to enable operators to offer services in a more flexible and efficient way. A mobile phone 103 may be used for transferring data or data packets in the PLMN network and may communicate with the GGSN which is indicated by arrow 104 in FIG. 1.

The communication between GGSN and SA node may be performed through the Network Access Server (NAS) interface. NAS interface uses Radius Authentication Dial In User Service (RADIUS) authentication for allocating the IP address (if needed) and RADIUS accounting for providing the IP address, International Mobile Subscriber Identity (IMSI) and Mobile Subscriber ISDN (MSISDN) to the SA node. That is, the GGSN 102 as well as the SA 101 may comprise an interface adapted to perform the necessary communication for a RADIUS service. In FIG. 1 the communication relating to the RADIUS service is indicated by the arrow 105. For example, the NAS interface can be formed a 3rd party GGSN that acts as a RADIUS client and a SA node that acts as a RADIUS server. The user plane traffic is carried in plain IP, Generic Routing Encapsulation (GRE) or IP-in-IP tunnels which is indicated schematically by the pipe 106 and the RADIUS signalling is used to set up the user plane traffic in a similar way as in the GPRS/3G networks. The NAS interface can be referred to as being the southbound Gi interface, as an alternative to the Gn interface.

FIG. 2 schematically illustrates a flowchart 200 of a method according to an exemplary embodiment.

When an "Accounting-Request-Stop" message is received 201, it is checked if the Accounting Session ID matches any of the Accounting Session ID of the NAS Contexts 202.

1. If a match is found 203 then:
It is checked whether a Session Stop Indicator attribute is included 204.
In case the Session Stop Indicator attribute is included 205 the NAS Context is deactivated 206. The deactivation may also inform external network nodes (Charging, RADIUS).
If the Session Stop Indicator attribute is not included 207 then it is further checked whether the Accounting Session ID is the last Accounting Session ID relating to the respective NAS session or NAS context 208.
If this is the last Accounting Session ID of the NAS Context 209 then it is removed from the NAS context and an operator configurable IDLE timer is started 210. After the IDLE timer expires and no user plane traffic is received for that NAS Context, the NAS context is disabled.
If this is not the last Accounting Session ID of the NAS context 211 then only the Accounting Session ID is removed from the NAS Context 212.

2. If a match is not found 213 then:
It is checked whether an existing NAS context is found with same Framed-IP-Address and/or same Called-Station-Id (APN) and/or same Calling-Station-Id (MSISDN), and/or 3GPP-IMSI 214.
In case such a matching is found, i.e. an active NAS context is found 215, it is checked whether a Session Stop Indicator attribute is included 216.
If such a Session Stop Indicator attribute is found 217 the NAS context is deactivated 218. The deactivation may also inform external network nodes (Charging, RADIUS).
If the Session Stop Indicator attribute is not included 219 the received RADIUS message is ignored and the NAS context is kept active 220.
If an existing NAS context is not found with same Framed-IP-Address and/or same Called-Station-Id (APN) and/or same Calling-Station-Id (MSISDN), and/or same 3GPP-IMSI 221 the received RADIUS message is ignored 222.

It should be noted that the items stated under 1. may avoid any problems caused when GGSN fails to include session STOP indicator when it should be implemented, e.g. a RADIUS accounting STOP request, while the items stated under 2. may avoid dropping of data packets, since when using the respective method it may be possible that the SA node, e.g. a so-called Flexi node, is informed that secondary PDP contexts may exist in GGSN but not in the SA node.

Furthermore, it should be noted that IDLE timer defined here is not the same idle timer, which may be used in general to terminate idle bearer sessions in GGSN or SA node. Typical value for general idle timer can be several hours, while the IDLE timer used in this embodiment would typically have configured value as only a few minutes. If user plane traffic is detected before IDLE timer expires then SA node knows that there is active (but yet unknown) PDP context related to NAS context and it may start using general idle timer to detect inactivity in the NAS context. That is, the method according to an exemplary embodiment may comprise two different timers, which may operate in parallel or in series.

Even if usage of IDLE timer means that detection of the terminated PDP session may happen later than it actually occurred, the SA node will use the correct termination time when it is informing other nodes about the terminated NAS context. Event-Timestamp attribute can be used in RADIUS and Diameter requests originated from the SA node to indicate the right time when the NAS context was terminated and Change Time information element in CDR will be used for same purpose in offline charging interface.

The embodiments can be implemented in computing hardware (computing apparatus) and/or software, such as (in a non-limiting example) any computer that can store, retrieve, process and/or output data and/or communicate with other computers. The processes can also be distributed via, for example, downloading over a network such as the Internet. The results produced can be output to a display device, printer, readily accessible memory or another computer on a network. A program/software implementing the embodiments may be recorded on computer-readable media comprising computer-readable recording media. The program/software implementing the embodiments may also be transmitted over a transmission communication media such as a carrier wave. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004). In a device claim enumerating several units, several of these means be embodied by one and the same item of software or hardware. The mere fact that certain measures are recited in mutually different dependent claims does not indicate that a combination of these measures cannot be used to advantage.

What is claimed is:

1. A method of deciding to release communication resources used for a network access server session in a communication network, the method comprising:
receiving an accounting stop request for a Packet Data Protocol (PDP) context associated with the network access server session;
determining whether a session stop indicator is included in the accounting stop request;
determining whether further PDP contexts are associated with the network access server session when a determination is made that no session stop indicator is included in the accounting stop request; and
starting an IDLE timer to determine a point in time to release the communication resources when a determination is made that no further PDP contexts are associated with the network access server session.

2. The method according to claim 1, wherein the determination of the point in time is based on a predetermined time interval measured from the starting of the IDLE timer.

3. The method according to claim 1, further comprising:
checking whether further communication associated with the network access server session is performed in the communication network when the IDLE timer is started.

4. The method according to claim 3, further comprising:
deactivating the network access server session when no further communication is performed until the determined point in time is reached.

5. The method according to claim 1, further comprising:
deactivating the network access server session when a determination is made that the session stop indicator is included in the accounting stop request.

6. The method according to claim 1, further comprising:
removing an accounting session identifier from a network access server context associated with the network access server session when a determination is made that no accounting session identifier is included in the accounting stop request.

7. The method according to claim 1, further comprising:
comparing an accounting session identifier implemented in the accounting stop request with accounting session identifiers associated with network access server sessions before the determination as to whether the session stop indicator is included in the accounting stop request is performed.

8. The method according to claim 7, further comprising:
removing an accounting session identifier from a network access server context corresponding to or associated with the respective network access server session.

9. The method according to claim 7, further comprising:
determining whether a value of an identification parameter implemented in the received accounting stop request matches a value of a corresponding identification parameter associated with the network access server session.

10. The method according to claim 9, further comprising:
ignoring the received accounting stop request at a receiving side of the communication network when no matching value of the identification parameter is found.

11. The method according to claim 9, further comprising:
deactivating the network access server session when a determination is made that a session stop indicator is included in the accounting stop request when a matching value of the identification parameter is found.

12. The method according to claim 9, further comprising:
ignoring the received accounting stop request at the receiving side when a determination is made that no session stop indicator is included in the accounting stop request when a matching value of the identification parameter is found.

13. A non-transitory computer-readable medium, in which a computer program is stored to cause a processor to execute a method, comprising:
receiving an accounting stop request for a Packet Data Protocol (PDP) context associated with a network access server session in a communication network;
determining whether a session stop indicator is included in the accounting stop request;
determining whether further PDP contexts are associated with the network access server session when a determination is made that no session stop indicator is included in the accounting stop request; and
starting an IDLE timer to determine a point in time to release communication resources used for the network access server session when a determination is made that no further PDP contexts are associated with the network access server session.

* * * * *